United States Patent [19]

Pastor

[11] Patent Number: 5,031,215
[45] Date of Patent: Jul. 9, 1991

[54] UNAMBIGUOUS ALPHABET FOR DATA COMPRESSION

[76] Inventor: Jose Pastor, 191 Wilton Rd., Westport, Conn. 06880

[21] Appl. No.: 515,531

[22] Filed: May 29, 1990

Related U.S. Application Data

[63] Continuation of Ser. No. 245,611, Sep. 19, 1988, abandoned.

[51] Int. Cl.$^5$ ............................................. H04L 9/00
[52] U.S. Cl. ......................................... 380/51; 380/30; 380/54
[58] Field of Search ............................... 380/30, 51, 54

[56] References Cited

U.S. PATENT DOCUMENTS

| | | | |
|---|---|---|---|
| 1,021,189 | 3/1912 | Hill | 380/54 |
| 3,605,093 | 9/1971 | Parks et al. | 382/21 |
| 3,890,596 | 6/1975 | Beun et al. | 382/26 |
| 4,637,051 | 1/1987 | Clark | 380/51 |
| 4,757,537 | 7/1988 | Edelmann et al. | 380/51 |
| 4,802,218 | 1/1989 | Wright et al. | 380/51 |
| 4,949,381 | 8/1990 | Pastor | 380/51 |

OTHER PUBLICATIONS

U.S. application Ser. No. 924,473 by Jose Pastor et al., filed: Oct. 29, 1986.

*Primary Examiner*—Thomas H. Tarcza
*Assistant Examiner*—David Cain
*Attorney, Agent, or Firm*—Robert H. Whisker; Melvin J. Scolnick; David E. Pitchenik

[57] ABSTRACT

An item bearing an indicia which verifies a status of the item and a method and apparatus for applying such indicia. The indicia represents an encrypted message and has the form of a number n base N number system represented by characters selected from an unambiguous machine-readable character set having n characters. The characters consist of connected graphs drawn on a predetermined grid and meeting certain selected requirements. A set of descripters is selected, including a number of type 1 and type 3 points in a character and a subset of characters is selected from the set of all possible characters meeting the requirements so that each character is unambiguously described in terms of the selected descripters. In one embodiment disclosed the item is a mail piece and the status is the payment of postage.

13 Claims, 5 Drawing Sheets

FIG. 4
FIG. 5
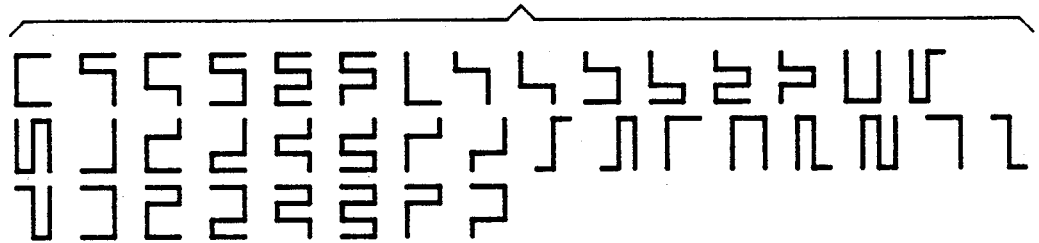
FIG. 6
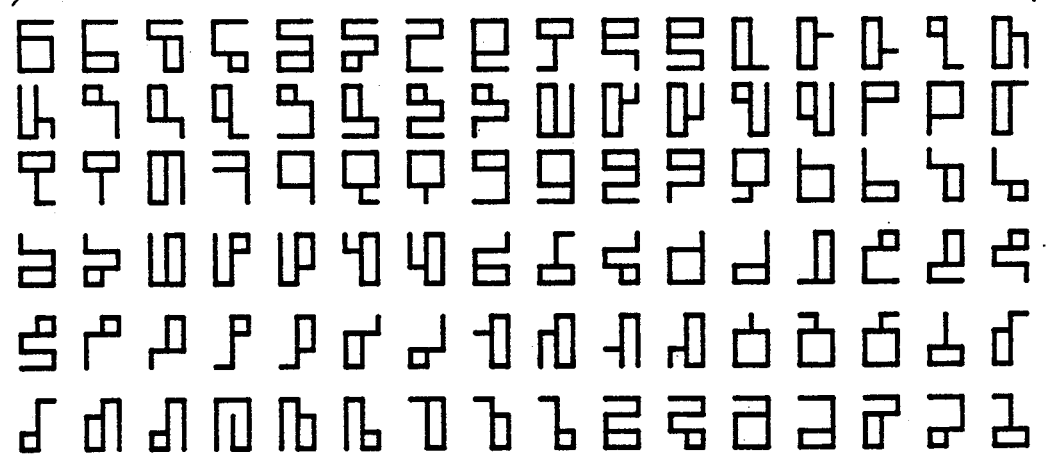

UNAMBIGUOUS ALPHABET FOR DATA COMPRESSION

This application is a continuation of application Ser. No. 245,611, filed Sept. 19, 1988, now abandoned.

BACKGROUND OF THE INVENTION

This invention relates to electronic postage meters and metering systems, and particularly to an improved method and apparatus for insuring the validity of a postal indicia printed by a postage metering system. The terms electronic postage meter and metering system, as used herein, also refer to other similar systems, such as parcel registers and tax stamp meters that dispense and account for value, and generally to systems for applying indicia to items to verify payment, or other status for that item.

Since a postage meter may be looked upon as a machine for printing money (i.e. symbols having value) security has always been considered the heart of postage meter operation. In prior postage meters indicia are printed by letter press, using a uniquely engraved dye containing postal information; the information being such that the metered postage indicia is traceable to a particular postage meter. Newer postage meters have been developed that include electronically controlled printers such as thermoprinters, ink jet, or dot matrix pin printers for printing the indicia. While these newer meters work well in concept, they have significant security problems which must be addressed since such indicia are easily printed by anyone having a suitably programmed computer and an appropriate printer. One way to insure the validity of a particular indicia has been to encode a message in the indicia in such a manner that an unauthorized person who does not know the encryption scheme cannot reproduce the appropriate encoding. Such meters using encoded information in the indicia are disclosed, for example in co-pending application Ser. Nos. 724,372, to: Arno Mueller, filed Apr. 7, 1985 and in a co-pending application by R. Sansone, entitled: POSTAGE AND MAILING INFORMATION APPLYING SYSTEM, filed Aug. 6, 1985, both assigned to the assignee of the present application.

In a system disclosed in application Ser. No. 515,073, to: John Clark, filed July 18, 1983, and assigned to the Assignee of the present invention, there is taught another method and apparatus for producing coded indicia. This application teaches encoding such that the indicia is printed in human readable form with the pixels forming the indicia modified, by voids or displacements or the like, to produce a coded message which can then be decoded to verify that the coded information is identical to the human readable information of the indicia.

Such systems generally are operative for their intended purpose, but suffer from limitations and disadvantages. First, in many cases the encryption scheme used to encode the information may be relatively simple and subject to attack by sophisticated computer analysis. Once a dishonest user is in possession of the encryption scheme used, he would be in a position to generate undetectable counterfeit indicia. When it is considered that high volume mailers, such as insurance companies, credit card companies, or oil companies may spend hundreds of thousands, if not millions, of dollars per year on postage, the incentive for such attacks can easily be seen. Another disadvantage of the above schemes is that, while it is highly desirable to use a distinct encryption key for each postage meter so that a breach of security for a single meter will not jeopardize the entire meter population, using conventional encryption, this approach would require that the postal service maintain a data base of keys for each of the hundreds of thousands of postal meters in service.

As is described in the commonly assigned U.S. Pat. application Ser. No.: 140,051; to: Jose Pastor; for: SYSTEM FOR CONVEYING INFORMATION FOR THE RELIABLE AUTHENTICATION OF A PLURALITY OF DOCUMENTS; filed Dec. 31, 1987 (C335) these problems are solved by the use of "public key" encryption systems, such as the generally known RSA encryption system. These systems provide two keys, one of which may be used to encrypt, but not decrypt, a message, and a second key which is used to decrypt the message. By use of such a public key system in the manner described in the above referenced patent application, the disclosure of which is hereby incorporated by reference, distinct encryption systems may be provided for each meter, yet the postal service need only maintain a single public key system to validate indicia. However, the use of the system taught in the above referenced patent application and the security of public key encryption schemes, both require that large amounts of information, on the order of from 100 to 200 decimal digits be printed on mail piece. Clearly, printing of such information in a conventional form as a string of decimal digits would be unacceptable.

Accordingly, it is an object of the present invention to provide a method for the validation of the status of an item, and particularly to validate the payment of postage on a mail piece.

More particularly, it is an object of the present invention to validate a status of an item by applying an indicia representative of large amounts of encrypted data in an acceptable manner.

BRIEF SUMMARY OF THE INVENTION

The above objects are achieved and the disadvantages of the prior art are overcome in accordance with the subject invention by means of an indicia applied to such item, and a method and apparatus for applying such indicia, which indicia represents an encrypted message and has the form of one or more characters selected from a set of characters consisting of N characters formed as connected graphs; the N characters forming a base N number system. In accordance with the subject invention, each of the characters is at least partially identified by the number of type 1 points and the number of type 3 points in each of said characters. (As used herein, the phrases "type 1", "type 2", "type 3", etc. refer to nodes in a graph at which the specified number of branches connect. That is, a "type 1, " is node at which one branch connects, a "type 2, " is a node at which two branches connect, etc.

In another, embodiment of the subject invention the nodes of the graphs comprising the characters are positioned on a predetermined grid and the numeric values are further determined by the spatial relationship between the type 1 and type 3 points.

In still another embodiment of the subject invention, the numeric values are still further determined by geographic features of the characters. ("Geographic features" as used herein refers to areas of a character which are partially or fully enclosed by the graph comprising the character. More particularly, fully enclosed areas are sometimes referred to herein as "lagoons" and partially enclosed areas are sometimes referred to as "bays".)

In still another preferred embodiment of the subject invention, the message is encrypted using a public key encryption system such as RSA.

Thus, it may be seen that the above objects are achieved in accordance with the subject invention in a manner which is particularly advantageous for use with postage meters and similar systems using various forms of conventional, computer control printing, such as ink-jet printers, or matrix printers. Other objects and advantages of the subject invention will become apparent to those skilled in the art from consideration of the attached drawings and the detailed description set forth below.

BRIEF DESCRIPTION OF THE DRAWINGS

FIGS. 4-6 shows characters in accordance with one embodiment of the subject invention having zero type 1 and zero type 3 points, 2 type one and zero type 3 points, and 1 type one and one type 3 points, respectively.

DETAILED DESCRIPTION OF PREFERRED EMBODIMENTS

Figure 1:
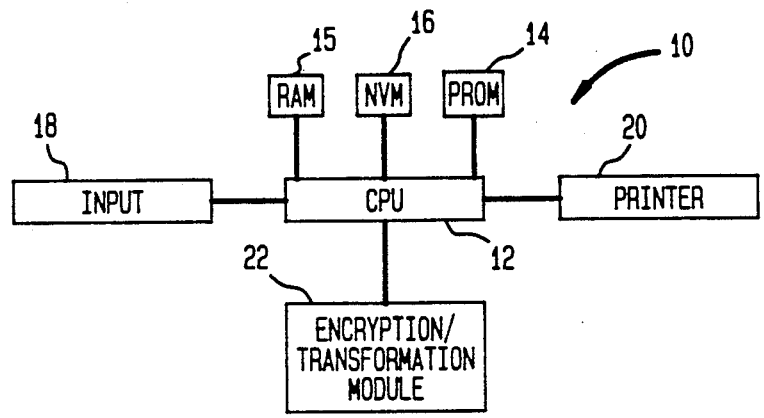
FIG. 1 shows a block diagram of a system for printing an indicia in accordance with the subject invention.

FIG. 1 shows a postage metering system 10 in accordance with the present invention. System 10 includes CPU, or microprocessor 12 which operates under control of a program residing in PROM 14 and controls the basic meter functions, performs calculations based on any input data, and controls the flow of data into various memories. Typically, a random access memory (RAM) 15 is connected to CPU 12 for the storage of real time information and for real time accounting of critical information including the updating of ascending and descending meter registers, which record the postage value expended and available respectively. The register values are then stored in more permanent form in non-volatile memory 16 either when power is interrupted or on a real time basis, as is well known in the art.

The system operates in accordance with data (e.g. the postage value to be metered) supplied from an input, such as keyboard 18 or from another remote communication device. Such operation of postage meters is well known and is described, for example in U. S. Pat. No. 4,301,507 to Soderberg.

Metering system 10 differs from conventional postage meters using letter press printing in that CPU 12 is coupled to conventional, non-secure printer 20. Printer 20 receives print signals from CPU 12 for printing of postal information on an envelope, label or the like. Printer 20 may be a conventional dot-matrix pin printer, or anyone of a number of like devices, such as ink jet printers, thermal printers, or LED printers, suitable for receiving electronic signals and applying corresponding pixels to an item.

As also seen in FIG. 1 CPU 12 is coupled to encryption/transformation module 22. Module 22 operates on data to generate an encrypted message in the manner described in the above referenced commonly assigned patent application Ser. No.: 140,051. This message is preferably encrypted using a public key encryption system, most preferably RSA, and formatted as a number in a base N number system as will be described further below.

Figure 2:
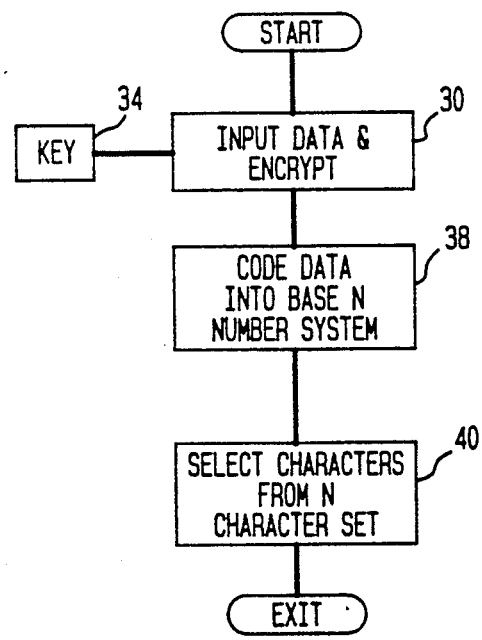
FIG. 2 shows a flow chart of the operation of the system of FIG. 1.

FIG. 2 shows a flow chart of the functions performed in module 22. It will be understood by those skilled in the art that, while module 22 is shown as a physically separate module including a microprocessor, which communicates in a conventional manner with CPU 12, that, depending upon the computational power of CPU 12, the functions shown in FIG. 2 may be performed by means of a program stored in PROM 14 and executed in a conventional manner by CPU 12.

Digital data is input and encrypted at 30 in accordance with public key 34 as is described in the above referenced commonly assigned patent application Ser. No. 140,051. At 38 the encrypted data is formatted as a number in a base N number system and, preferably, an error code is generated and added. (The error code is conventional and may be a simple parity bit or may be a more extensive error detecting or correcting code.) At 40 appropriate characters to represent the encoded data as a number in a base N number system are selected.

To represent 100 decimal digits in a base N number system, approximately 100 divided by $\log_{10} N$ characters selected from an N character set are required. As will be described further below in accordance with one embodiment of the subject invention, a character set having in excess of 1,000 characters may be defined on a two by three rectangular grid (i.e. a grid having 12 intersections) and (assuming 200 pixels per inch, $10 \times 15$ pixels per character) the 100 decimal digits can be printed as a block of approximately 33 characters in an area approximately $1.6 \times 0.2$ inches. Further, as will be described below, since the character set is particularly selected in accordance with the subject invention for ease of recognition and is easily partitioned into sub groups, it is believed that this recognition can be achieved with equal or superior accuracy to the recognition of conventional decimal digits without substantial increase in the time required for recognition.

In one embodiment of the subject invention, the characters are selected from the set of connected graphs which may be drawn on a $2 \times 3$ rectangular grid. That is the allowed nodes of the graphs are arranged in a $3 \times 4$ rectangular array and only horizontal or vertical branches are allowed. For such graphs the following properties may be demonstrated (where n1 and n3 equal the number of type 1 and type 3 points respectively and a type 4 point is, by definition, taken as two type 3 points.):

$n_1 + n_3$ is even, and $n_1 \max = n_3 + 2$

For further ease in recognition the possible characters are limited in accordance with one embodiment of the subject invention by the requirements that:

The character completely traverse the grid. That is a connected path exist from the left edge to right edge and from the top to bottom of the grid for each character.

All bays must be completely open. That is, if a bay opens to the east, that opening must be coextensive with the west boundary of the bay.

All bays must be concave and simple. That is, all bays must be formed by only three or two segments.

Figure 3:
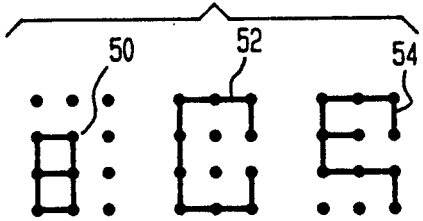
FIG. 3 shows an illustration of requirements placed on characters in accordance with one embodiment of the subject invention to enhance recognition.

Characters 50, 52 and 54 shown in FIG. 3 illustrate the failure to meet each of the above requirements respectively.

FIGS. 4-6 show characters generated in accordance with the above requirement which have zero type 1 points and zero type 3 points, 2 type 1 points and zero type 3 points, and 1 type 1 point, and 1 type 3 points. Table 1 below shows the total number of graphs meeting the above requirements grouped according to the numbers of type 1 and type 3 graphs. The total number of points meeting the above requirements has been determined to be, as shown in Table 1, 8,497; which would result in a reduction by a factor of $\log_{10} 8{,}497 = 3.92$ in the number of characters required to represent a number expressed in decimal digits. (i.e. 100 decimal digits requires approximately 20 characters, 200 approximately 51 characters, etc.)

and where the points are on a negative diagonal, the character is classified IV. Thus, four characters may be identified from the group having two type 1 points and zero type 3 points based upon a simply determined relationship between the two points. Those skilled in the art will immediately recognize that a much larger number of characters can be recognized from other subgroups based simply upon the spatial relationship between the type 1 and type 3 points, and that if the total number N of characters points selected based on this description is considered sufficient, a remarkably simple and efficient character recognition scheme is provided.

Figure 7:
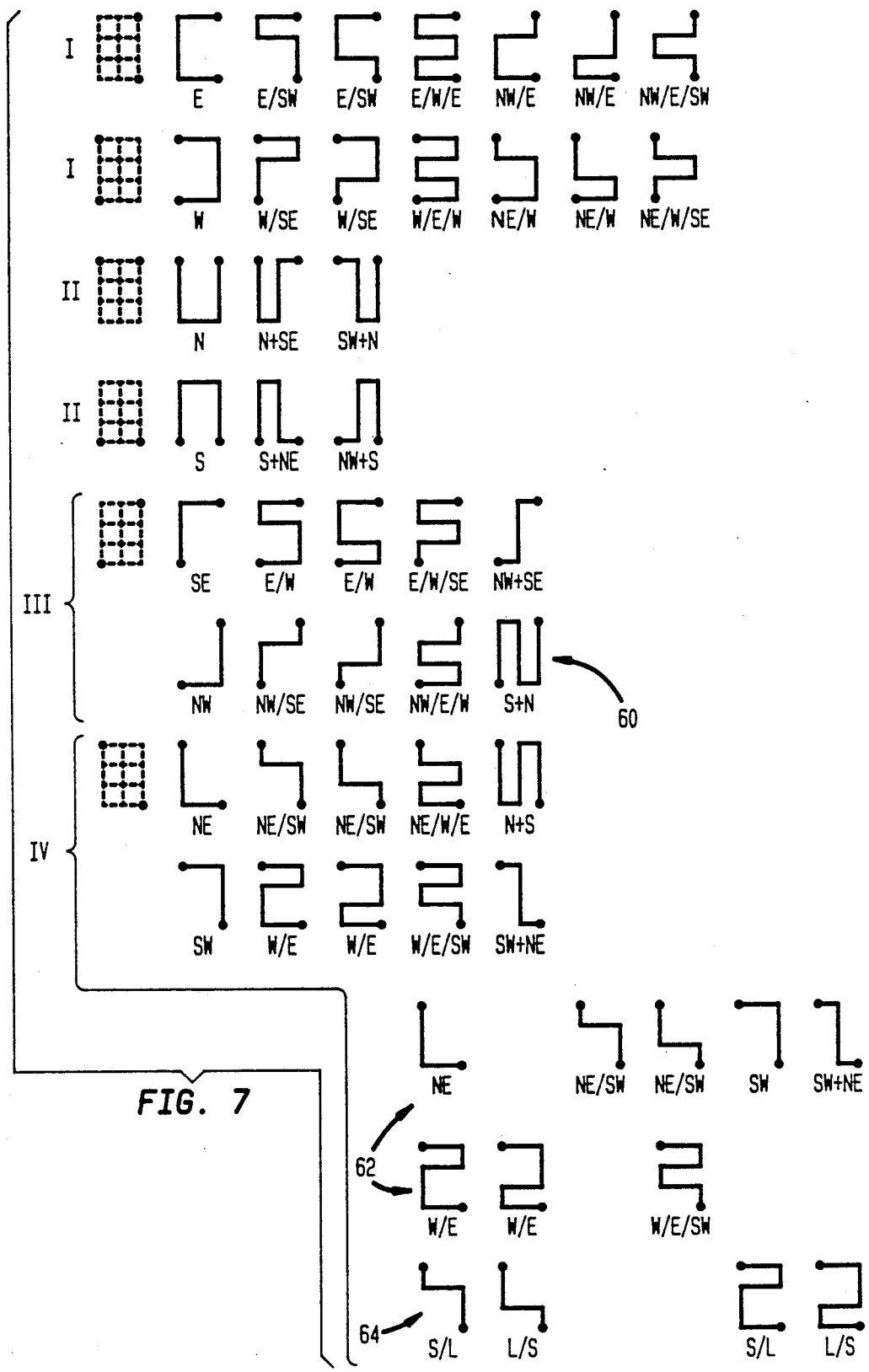
FIG. 7 shows an illustration of the recognition of characters in the group of characters having zero type 3 and 2 type 1 points in accordance with one embodiment of the subject invention.

However, in other embodiments of the subject invention, a larger value for N may be desired. In this case the characters must be further described. Thus, at 62 in FIG. 7 the characters classified in classification 3 are further described in accordance with geographical features. This description shows that one character has a bay opening to the northeast, two characters have bays opening to the northeast over bays opening to the southwest, one character has a bay opening to the southwest, one character has a bay opening to the southwest adjacent to a bay opening to the northeast, two characters have bays opening to the west over bays opening to the east, and one character has a bay opening to the west over a bay opening to the west over a bay opening to the east over a bay opening to the southwest. By discarding one character from each of the two sets

TABLE ONE

| Type 1 Points | Type 3 Points | | | | | | | | Total |
|---|---|---|---|---|---|---|---|---|---|
| | 0 | 1 | 2 | 3 | 4 | 5 | 6 | 7 | 8 | |
| 0 | 1 | | 40 | | | | | | | 41 |
| 1 | | 96 | | 296 | | | | | | 392 |
| 2 | 42 | | 611 | | 724 | | | | | 1377 |
| 3 | | 394 | | 1204 | | 652 | | | | 2250 |
| 4 | 89 | | 885 | | 942 | | 216 | | | 2132 |
| 5 | | 340 | | 698 | | 316 | | 20 | | 1374 |
| 6 | 56 | | 322 | | 222 | | 41 | | 1 | 642 |
| 7 | | 94 | | 100 | | 28 | | | | 222 |
| 8 | 13 | | 32 | | 10 | | 1 | | | 56 |
| 9 | | 8 | | 2 | | | | | | 10 |
| 10 | 1 | | | | | | | | | 1 |
| Total | 202 | 932 | 1890 | 2300 | 1898 | 996 | 258 | 20 | 1 | 8497 |

While it is within the contemplation of the subject invention to use the entire character set identified in Table 1, and even to reduce the requirements set forth above to make use of even larger character sets, it is preferred to further restrict the character set so that the characters may be unambiguously identified using a minimal number of descriptive characteristics. This is illustrated with respect to one subgroup of characters in FIG. 7. In accordance with a feature of the subject invention, a scanned character is first grouped by the number type 1 points and the number of type 3 points in the graph, in this case characters having 2 type 1 points and 0 type 3 points. If no further recognition were done, only one character could be selected for the character set from each subgroup of characters. Accordingly, in a preferred embodiment of the subject invention the characters are further identified by the spatial relationships between the type 1 and type 3 points. Thus, at step 60 shown in FIG. 7, each character is classified in accordance with the spatial relationship between the two type 1 points. Thus, where the points are above each other, the character is classified I, where the points are adjacent, the characters classified II, where the points are on a positive diagonal, the character is classified III, of duplicate characters, six characters may be generated from the subgroup having two type 1 points and 0 type 3 points, classification 3. Again, those skilled in the art will recognize that description in terms of geographical features will again greatly increase the number of characters which may be distinguished and provide a larger value for N.

If it is desired to use the entire set of possible characters (i.e. the full 8,497), metric characteristics must be obtained to distinguish those characters which may not be distinguished in terms of the spatial relationships between the type 1 and type 3 points and the descriptions in terms of geographic features. At step 64 it may be seen that the two pairs of duplicate characters can be distinguished on the basis of whether the larger feature is above or below the smaller. In general however, it is believed preferable to limit the character set to characters which may be distinguished without resort to metric characteristics.

Those skilled in the art will recognize that other characteristics of the characters could be used to identify them. For example, characters in FIG. 7 classified in the zero classification could be further distinguished based on whether the points were on the left or right edge of the grid.

Figure 8:
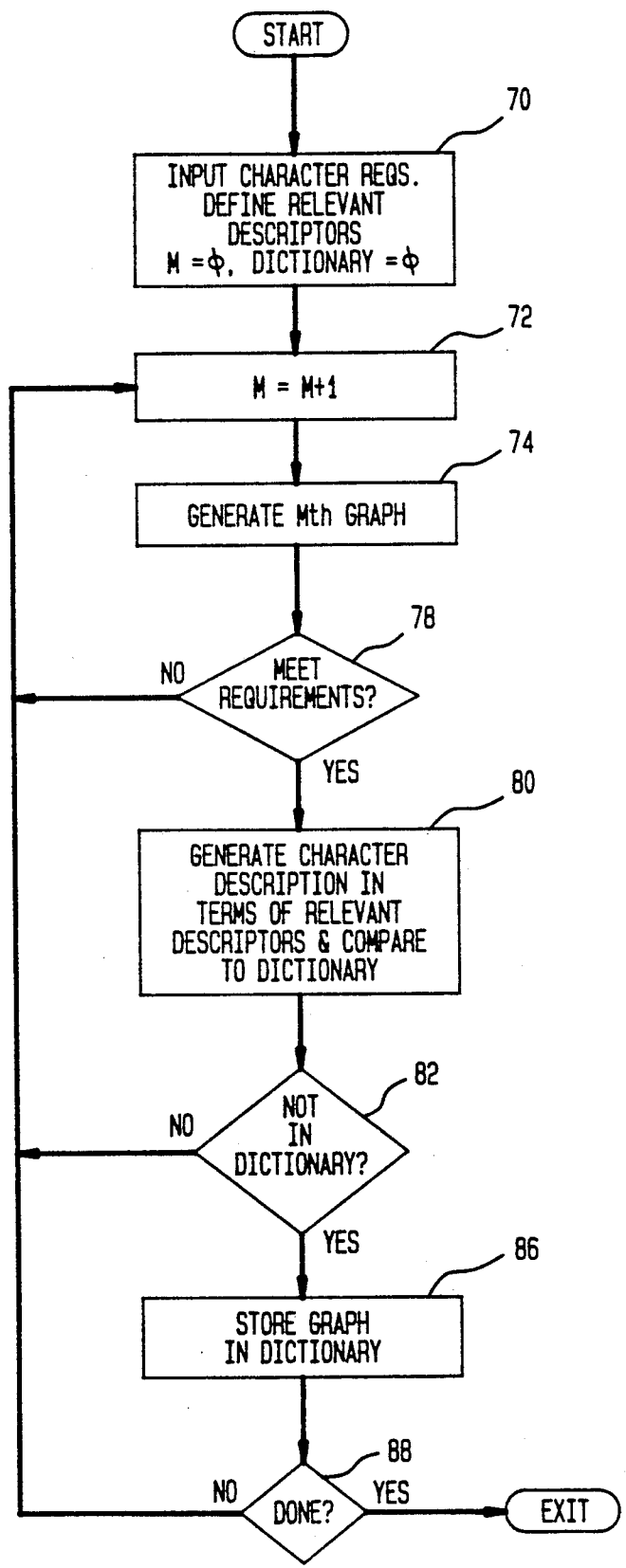
FIG. 8 shows a flow chart of the generation of a unique character set in accordance with the subject invention.

FIG. 8 shows a flow chart of the generation of an unambiguous character set in accordance with the subject invention.

At 70 the character requirements, e.g. that the characters are defined on a 2×3 rectangular grid, that the characters traverse the length and width of the grid, etc. are input along with the relevant descripters, e.g. the number of type 1 and type 3 points, the spatial relationship between such points, geographic features, etc. An index counter m is said equal to 0 and a file, herein referred to as the "Dictionary", is established.

By Dictionary herein is meant a listing in terms of the input descriptors and an associated identification, typically a number from 0 to N−1.

A convenient and preferred arithmetic whereby a description of a character may be notated and ordered is described in commonly assigned, co-pending U.S. application Ser. No.: 924,473; to: Jose Pastor et al.; for: OPTICAL CHARACTER RECOGNITION BY FORMING AND DETECTING MATRICES OF GEO FEATURES; filed: Oct. 29, 1986 (C-273), which is hereby incorporated by reference.

At 72 counter m is incremented and at 74 the mth graph is generated. A correspondence between graphs and the value of counter m is easily established by associating each possible branch, of which there are 17 for a 2×3 grid, with one digit of a binary number, the graph then includes a branch for each digit having a value of 1, thus giving $2^{17}-1$ possible graphs. At 78 the mth graph is tested to see if it meets the requirements, e.g. does it fully traverse the length and width of the grid, are all bays completely opened, etc. If not, at 72 m is incremented again, and at 74 the next graph is generated. Then at 80 a description in terms of the relative descripters is generated and compared to all other descriptions in the Dictionary. At 82 the description is tested to see if it is not in the dictionary. If it is in the dictionary, the process again returns to 72 to generate the next graph. If it is not in the dictionary, at 86 the graph is stored, as a description associated with a unique selected value, i.e. a number from zero to N−1, and at 88 counter m is tested to determine if all possible graphs have been generated. If they have not, the process again returns to 72, if they have the process exits.

The result of the process shown in FIG. 8 is a set of characters with unique descriptions each associated with a number from 0 to N−1. If it is believed that the value for N is not great enough, the process may be repeated using a further level of description to generate a larger character set, the character requirements may be relaxed, or a larger grid may be used to generate the characters. Conversely, if it is believed that the recognition logic for the resultant descriptions is too complex, a simpler set of descripters may be selected.

In recognizing a character, it is within the contemplation of the subject invention to fully scan each character to determine a complete description in accordance with the selected descripters and find the resulting description in the dictionary or to first scan the character to determine the number of type 1 and type 3 points and then select appropriate levels of description based on the number of such points. For example, it may prove desirable to describe the smaller subgroups in terms of the number of type 1 and type 3 points, the spatial relationship between such points, and geographic features; while describing larger subgroups, which as can be seen from Table 1 may include up to more than 1,000 possible graphs, only in terms of the number of type 1 and type 3 points and their spatial relationship. However, as noted above, it is a feature of the subject invention that the primary classification of each scan character is based on the number of type 1 and type 3 points and further rules for recognition, whether in the form of a dictionary or otherwise, are selected accordingly. It is preferred that, in this initial classification, type 4 points be considered equivalent to two type 3 points, though a distinction between type 4 and type 3 points may be made in any further recognition rules.

Figure 9:
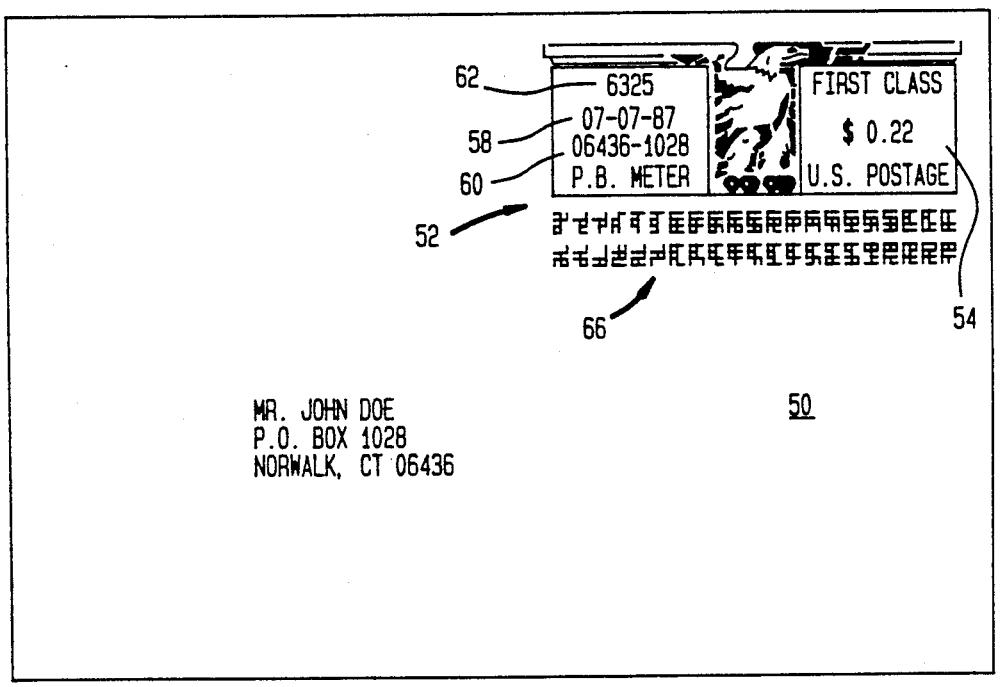
FIG. 9 shows a mail piece marked with postal indicia in accordance with the subject invention.

FIG. 9 shows an item to be mailed 50 (i.e. an envelope) marked with an indicia 52 produced in accordance with the subject invention. Indicia 52 includes the following plain text information relating to the item, a postage amount 54, a date 58 on which the item was metered, and I.D. number 60 for the meter, and a second I.D. number 62 for the postal station to which the item is to be delivered in accordance with U.S.P.S. regulations for metered mail. Indicia 52 also includes a number in an N base numeric system 66 representing the result of a public key encryption of at least a portion of the plain text information together with additional information as described in the above reference commonly assigned U. S. Pat. application Ser. No. 140,051. The 40 characters shown are equivalent, assuming that the entire 8,497 character set is used, to approximately 157 decimal digits; ample to provide security for a message encrypted with the preferred RSA encryption technique.

The above description and drawings have been provided by way of illustration only and will enable those skilled in the art to recognize numerous other embodiments of the subject invention. Accordingly, limitations on the subject invention are to be found only in the claims set forth below.

What is claimed is:

1. A method for determining a value comprised in a message, said message being represented by an indicia comprising a character selected from a group of N characters each having an assigned value, and each being formed as a connected graph, said indicia being a fixed to an item, and said message relating to the status of said item, comprising the steps of:
   a) scanning said character
   b) processing information obtained from said scanning to determine the number of type 1 points and the number of type 3 points comprised in said character;
   c) making a primary classification of said character to a subgroup of said characters based on said determined numbers of type 1 and type 3 points; and,
   d) if said subgroup consists of a single character determining said value to be the assigned value for said single character; and
   e) if said subgroup consists of a plurality of characters, determining said value to be the assigned value for a particular character comprised in said subgroup in accordance with further rules for recognition for said subgroup.

2. A method as described in claim 1 wherein the nodes of said graphs are positioned on a predetermined grid and comprise said type 1 and type 3 points.

3. A method as described in claim 2 wherein said further rules comprise a rule based on the spatial relationships between said type 1 and type 3 points.

4. A method as described in claim 3 wherein said further rules comprise a rule based on geographic features of said characters.

5. A method as described in claim 4, wherein said further rules comprise a rule based on metric features of said characters.

6. A method as described in claim 2, wherein said grids have the form of substantially rectangular arrays and no diagonal branches are included in said graphs.

7. A method as described in claim 6, wherein said graphs comprise connected paths which traverse the full height and the full width of said arrays.

8. A method as described in claim 6, wherein all bays in said graphs are concave.

9. A method as described in claim 6, wherein all bays in said graphs have complete openings.

10. A method as described in claim 1 or 2, wherein said item is a mail piece and said status is payment of postage for said mail piece.

11. A method as described in claim 10, wherein said message is encrypted to validate payment of postage for said mail piece.

12. A method as described in claim 11, wherein said message is encrypted using a public key encryption system.

13. A method as described in claim 5, wherein the logarithm, base 10, of N is greater than 1, whereby the number of characters necessary to express said message is reduced relative to the number of characters necessary in a base 10 number system by a factor approximately equal to said logarithm for if said message is sufficiently long.

* * * * *